Patented June 13, 1944

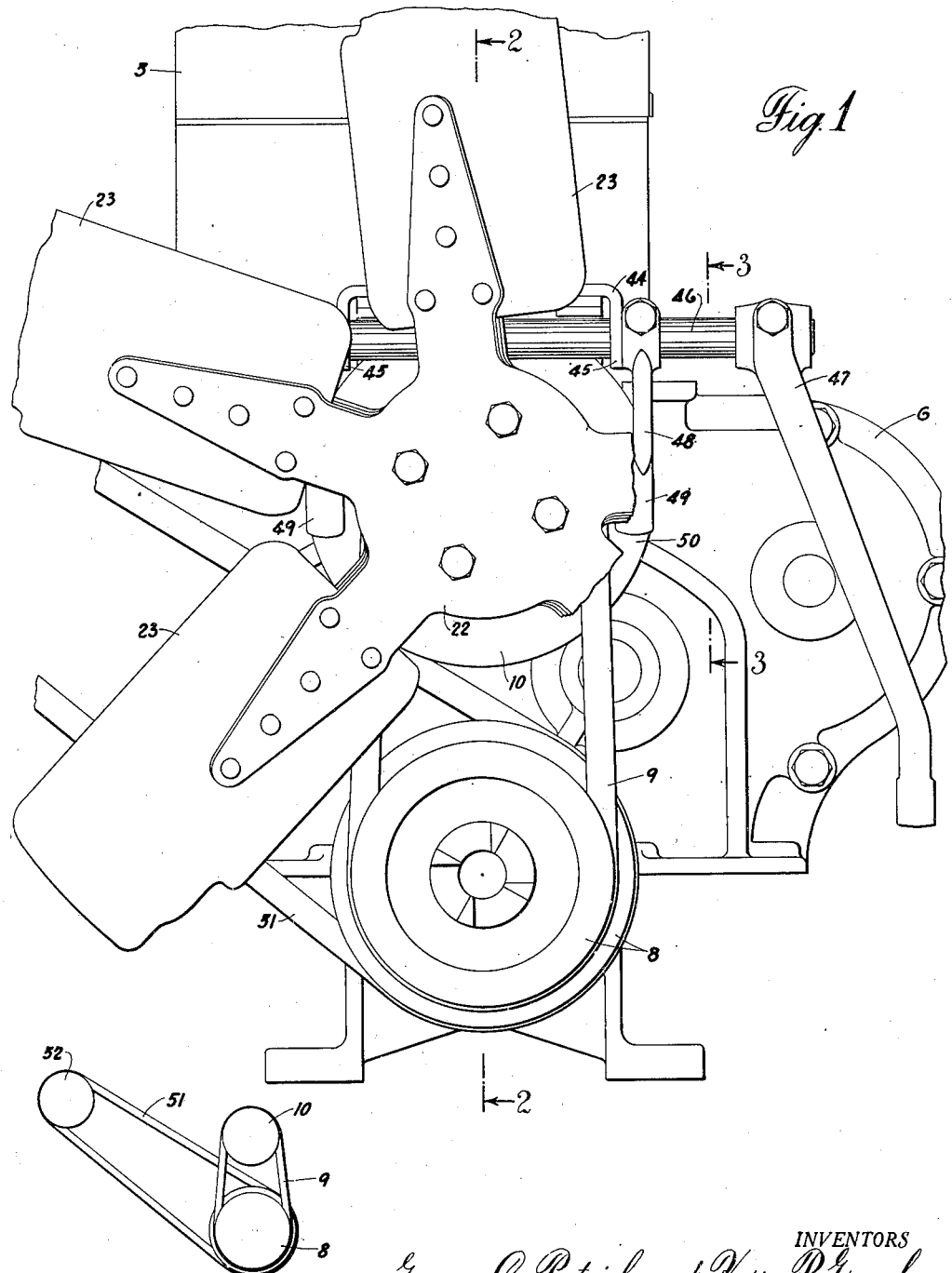

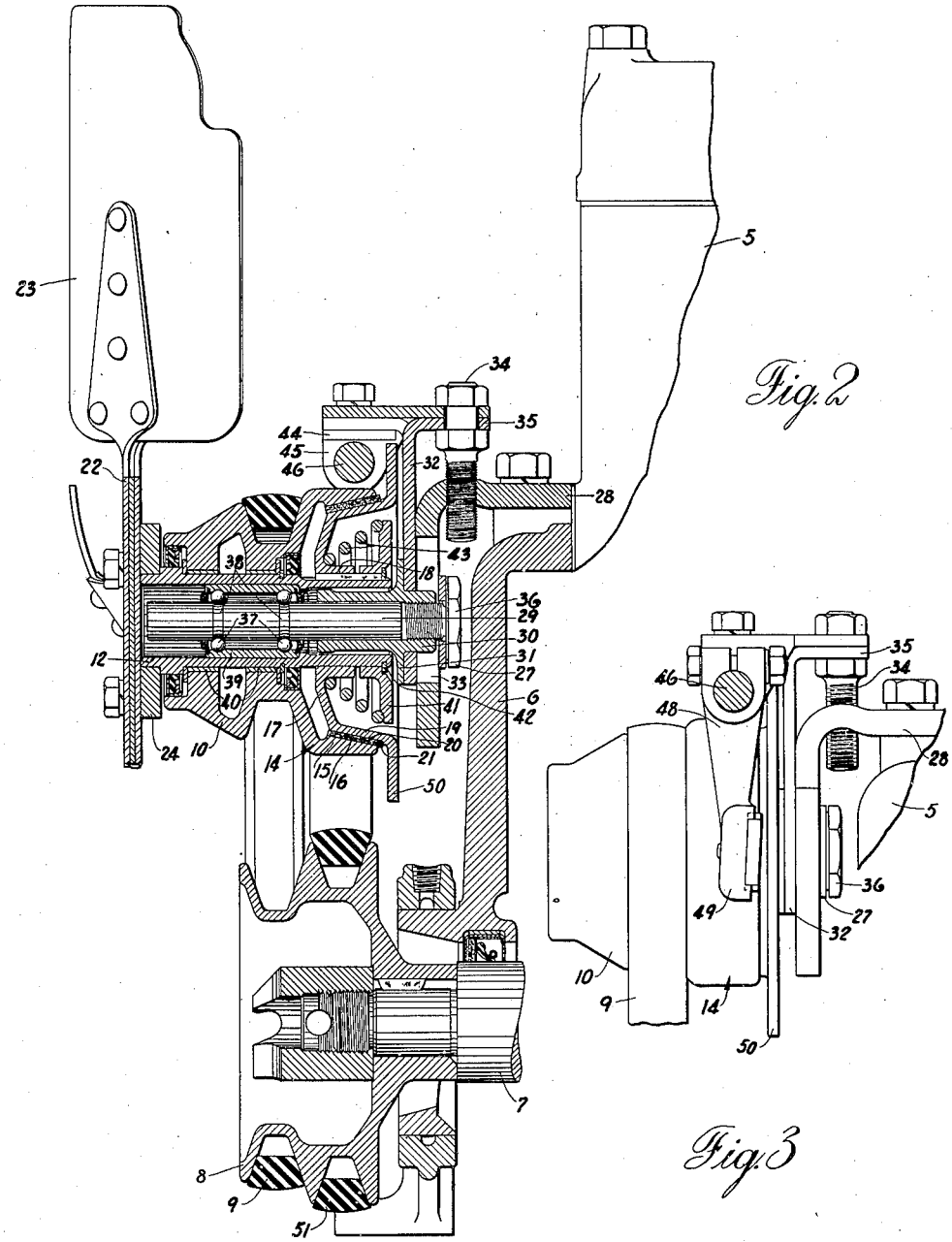

2,351,225

UNITED STATES PATENT OFFICE 2,351,225

ENGINE AND FAN ASSEMBLY

Grover C. Patrick and Harry R. Greenlee, South Bend, Ind., assignors to The Studebaker Corporation, South Bend, Ind., a corporation of Delaware Application October 5, 1942, Serial No. 460,892

9 Claims. (Cl. 230—271)

Our present invention relates to an improvement in an engine and fan assembly.

In designing internal combustion engines it has recently become the practice to position the fan shaft with respect to the crank shaft so that the blades of the fan extend beyond the axis of the crank shaft. This design of internal combustion engine has been brought about by the desirability of reducing the overall height of the engine assembly and further to locate the fan substantially centrally of the engine for more efficient cooling of the engine. Also by positioning the fan centrally of the engine a fan of much larger diameter may be employed and this substantially increases the rate of air flow past the engine. While this arrangement of the parts of an internal combustion engine has resulted in many advantages it has also resulted in rendering it impossible to manually crank the engine by means of engaging a crank with the crank shaft.

It is an object of our invention to provide an assembly comprising an engine and fan in which a fan shaft is driven from the crank shaft and in which the blades of the fan extend beyond the axis of the crank shaft with clutch means for disengaging the fan shaft from the crank shaft.

A further object is the provision of means actuatable for disengaging the clutch between the fan shaft and crank shaft and for braking the fan shaft and holding it against rotation. The clutch means of our invention is not limited for use in an engine and fan assembly of the character referred to but in its broader aspects may be incorporated with other forms of internal combustion engines and other devices in which it is desirable to selectively clutch or declutch two or more parts.

Our invention, when incorporated with an engine and fan assembly may be utilized to achieve other important advantages. For example, in starting an internal combustion engine in cold weather, the fan may be rendered inoperative so that the entire cranking force is available in cranking the engine. Also in cold weather the fan should be inoperative since its cooling action is not desirable so that, in addition to utilizing the torque necessary to drive it for cranking the engine, the engine may quickly reach its operating temperature. Also, when the invention is incorporated with vehicles of a character for fording streams and the like the fan may be rendered inoperative to prevent damage to it or to the vehicle.

More specifically, therefore, an object of our invention resides in the provision of a clutch means comprising driving and driven elements which are normally engaged for clutching together the parts carrying the elements and means for disengaging the driving and driven clutch elements operable upon actuation thereof for braking the driven clutch element.

A still further object resides in the provision of a clutch means comprising driving and driven elements normally engaged to clutch together the parts carrying the elements in which the driven clutch element is formed with a braking surface and a brake member operable to engage the braking surface of the driven clutch element to disengage it from the driving clutch element and substantially simultaneously brake the driven clutch element.

Other objects and advantages of our invention will appear from the detail description.

Now in order to acquaint those skilled in the art with the manner of constructing and utilizing our invention we shall describe in conjunction with the accompanying drawings a preferred embodiment of the same.

In the drawings:

Figure 1 is a front end elevational view of an internal combustion engine and fan assembly incorporating our invention;

Figure 2 is a vertical detail sectional view taken substantially on the line 2—2 of Figure 1, certain parts being shown in elevation for clearness of illustration;

Figure 3 is a side elevational view of Figure 1, the crank shaft pulley and fan being omitted and only a small portion of the internal combustion engine being shown; and Figure 4 is a diagrammatic view illustrating the relative positions of the crank shaft, fan and generator.

In the drawings we have shown an internal combustion engine 5 provided at its front end with a gear housing 6 through the lower end of which extends a crank shaft 7. A dual pulley wheel 8 is keyed to the crank shaft in a known manner and a fan belt 9 extends to a hub member 10 which is mounted for rotation coaxially and independently of a hollow fan shaft 12. A cone type clutch 14 comprising a driving clutch element 15 formed integrally with the hub member 10 has a tapered internal clutch surface 16. A second hub member 17 is splined at 18 to the inner end of the fan shaft 12, i. e., the end nearest the engine 5, and comprises a driven clutch element 19 formed with an extenal tapered clutch surface 20 which receives suitable friction material 21 by means of which the hub members 10 and 17 may be clutched together for conjoint rotation. The fan shaft 12 has suitably secured to its outer end a fan 22 comprising a plurality of radially spaced blades 23. The fan 22 may be secured to the outer end of the fan shaft in any suitable manner and in the embodiment of the invention shown this fastening means comprises an annular ring 24 which has a pressed fit with a reduced annular portion formed at the outer end of the fan shaft and preferably is brazed thereto. A plurality of threaded studs extend through the central laminated portion of the fan 22 and into the annular ring 24. It will be clear from Figure 1 that the engine is of a design in which the fan blades 23 extend beyond the longitudinal axis of the crank shaft 7 so that in order for the engine to be manually cranked it is necessary to disengage the fan and hold it against rotation to provide room for the crank between two adjacent fan blades. In the structure so far described it will be seen that rotation of the crank shaft 7 by the internal combustion engine 5 causes rotation of the hub member 10 which in the position of the parts shown in Figure 2 is clutched to the hub member 17 and since the latter is splined to the hollow fan shaft 12 of the fan 23 it will be rotated, causing air to flow past the engine. The fan shaft 12 is supported in spaced parallel relation to the crank shaft 7 by means of a bracket 28 which is suitably secured to the forward end of the timing gear case at the front end of the internal combustion engine 5. A spindle 29 is supported at its inner end in a sleeve 30 having an annular flange 31 which seats against the outer second bracket 32. The bracket 28 is slotted vertically at 33 to receive the reduced annular end of the sleeve extending inwardly from the annular flange 31 so that the bracket 28 and spindle 29 may be adjusted vertically relative to the crank shaft 7 by adjusting the threaded stud 34 carried by the flange 35 formed at the upper end of the bracket 32.

The sleeve 30 and spindle 29 are retained in adjusted position by means of the threaded stud 36 extending through the vertical slot 33 in the bracket 28 into the inner threaded end of the sleeve 30. A washer 27 disposed between the enlarged head of the stud 36 and bracket 28 engages the latter to secure the spindle in a fixed horizontal position. In order to adjust the position of the spindle 29 relative to the crankshaft 7, the stud 36 is loosened and the fan belt is tightened to the proper degree by the stud 34 after which the stud 36 is drawn up tightly to secure the parts in fixed position. The hollow fan shaft 12 is rotatably supported on the spindle 29 by two spaced sets of ball bearings 37 which are received in grooves 38 formed in opposite ends of the spindle and comprising inner races for the ball bearings, the outer race being formed by an annular sleeve 39 secured within the fan shaft. Suitable lubrication retaining packings are provided at each end of the annular sleeve 39. The hub member 10 is mounted for rotation independently of the fan shaft 12 by means of the annular spaced bushings 40 pressed into the hub 10.

As has already been described, the second hub member 17 is splined to the hollow fan shaft 12 and it will be seen that a spring seat member 41 is also carried by the spline 18 and is restrained against relative longitudinal movement by a locking ring 42 fixed to the inner end of the fan shaft 12. A tapered spiral coil spring 43 having its enlarged end seating on the spring seat member 10 normally urges the hub member 17 into clutching engagement with the hub member 10 through the friction material 21.

A bracket 44 is suitably secured or supported by the flange 35 of the bracket 28 and comprises a pair of spaced flange members 45 for rotatably supporting a shaft 46 extending transversely of the engine between it and the fan 22. A crank lever 47 is suitably secured to one end of the shaft 46 and is adapted to be manually actuated to rotate the shaft 46 in a counter-clockwise direction to cause a pair of spaced clutch fingers 48 suitably secured to the shaft 46, and having their free end portions 49 provided with suitable friction material to engage the outer surface of the annular flange 50 of the hub member 17. The hub member 17 is thus shifted longitudinally inwardly toward the internal combustion engine 5 to disengage the driving and driven clutch elements 15 and 19, respectively, and at the same time the driven clutch element 19 is being braked against rotation. The crank shaft 7 will cause continued rotation of the hub member 10 but it will be seen that since the hub member 17 is splined to the hollow fan shaft 12, the fan 22 will be held against rotation. This declutching and braking operation permits positioning of the fan 22 so that a crank may be inserted into the crank receiving portion of the crank shaft 7 between two adjacent blades 23 of the fan, permitting manual cranking of the engine. It will be understood that any suitable means may be provided for imparting rotary motion to the transverse shaft 46 and may, for example, comprise a rod having a handle at one end thereof disposed adjacent the operator of a vehicle or the like in which the assembly is mounted. Upon release of the crank lever 47 the tapered spiral coil spring 43 urges the driven clutch element 19 into clutching engagement with the driving clutch element 15 so that force will be transmitted to the hollow fan shaft to rotate the fan.

In Figure 4 it will be seen that a second belt 51 extends from the dual pulley wheel 8 to a generator 52 and that actuation of the clutch 14 to its inoperative position will not disengage the driving connection between the crank shaft and generator.

It will be understood that the mounting of the crank shaft in the lower end of the gear box is conventional and need not be described in further detail since this is well known to those skilled in the art.

While we have shown what we consider to be the preferred form of our invention it will be understood that various modifications and rearrangements may be made without departing from the spirit and scope of our invention.

We claim:

1. In combination, a crank shaft, a fan shaft spaced from said crank shaft, a fan having blades which extend beyond the axis of said crank shaft carried by said fan shaft, means adapted to transmit driving force from said crank shaft to said fan shaft to rotate the latter, and means for substantially simultaneously braking said fan shaft against rotation and declutch said fan shaft from said crank shaft.

2. In combination, a crank shaft, a fan shaft spaced from said crank shaft, a fan having blades which extend beyond the axis of said crank shaft carried by said fan shaft, means adapted to transmit driving force from said crank shaft to said fan shaft to rotate the latter, and means comprising a brake for braking said fan shaft and a clutch operable upon actuation of said brake to declutch said fan shaft from said crank shaft.

3. In combination, a crank shaft, a fan shaft spaced from said crank shaft, a fan having blades extending beyond the axis of said crank shaft mounted on said fan shaft, a hub member rotatable coaxially of said fan shaft, driving means connecting said hub member to said crank shaft for rotating the former, a clutch having driving and driven clutch elements, said driving element being carried by said hub member and said driven element being connected to said fan shaft, said clutch being operable to engage said driving and driven elements so that said crank shaft is adapted to cause rotation of said fan shaft, and means for disengaging said driving and driven clutch elements comprising a brake means for braking said driven clutch element.

4. In combination, a crank shaft, a fan shaft spaced from said crank shaft, a fan having blades extending beyond the axis of said crank shaft carried by said fan shaft, a hub member rotatable coaxially of said fan shaft, driving means connecting said hub member to said crank shaft for rotating the former, a second hub member splined to said fan shaft and shiftable axially thereon, said first and second hub members having annular friction surfaces disposed in overlapping relation which are adapted to be engaged to clutch said hub members together upon axial shifting movement of said second hub member, said second hub member having an annular portion providing a braking surface, and means operable for shifting said second hub member axially away from said first hub member to disengage their clutching surfaces and engage the braking surfaces of said second hub member to hold it against rotation.

5. In combination, a crank shaft, a fan shaft spaced from said crank shaft, a fan having blades extending beyond the axis of said crank shaft carried by said fan shaft, a hub member rotatable co-axially of said fan shaft adapted to be continuously driven by said crank shaft, a second hub member rotatable conjointly with said fan shaft, a clutch comprising driving and driven clutch elements one being associated with each of said hub members, one of said hub members being movable relative to the other hub member for clutching or declutching them, selectively, means normally retaining the clutch elements of said hub members engaged, and means for shifting one of said hub members to disengage said clutch elements and substantially simultaneously brake one of said hub members.

6. In an assembly comprising, a fan shaft carrying a fan and a driven crank shaft spaced from said fan shaft, the combination therewith of means adapted to transmit driving force from said crank shaft to said fan shaft to rotate the latter, and means comprising a brake for braking said fan shaft and a clutch operable upon actuation of said brake to declutch said fan shaft from said crank shaft.

7. In an assembly comprising, a fan shaft carrying a fan and a driven crank shaft spaced from said fan shaft, the combination therewith of a hub member rotatable coaxially of said fan shaft, driving means connecting said hub member to said crank shaft for rotating the former, a clutch having driving and driven clutch elements, said driving element being carried by said hub member and said driven element being connected to said fan shaft, said clutch being operable to engage said driving and driven elements so that said crank shaft is adapted to cause rotation of said fan shaft, and means for disengaging said driving and driven clutch elements comprising a brake means for braking said driven clutch element.

8. In an assembly comprising, a fan shaft carrying a fan and a driven crank shaft spaced from said fan shaft, the combination therewith of a hub member rotatable coaxially of said fan shaft, driving means connecting said hub member to said crank shaft for rotating the former, a second hub member splined to said fan shaft and shiftable axially thereon, said first and second hub members having annular friction surfaces disposed in overlapping relation which are adapted to be engaged to clutch said hub members together upon axial shifting movement of said second hub member, said second hub member having an annular portion providing a braking surface, and means operable for shifting said second hub member axially away from said first hub member to disengage their clutching surfaces and engage the braking surfaces of said second hub member to hold it against rotation.

9. In an assembly comprising, a fan shaft carrying a fan and a driven crank shaft spaced from said fan shaft, the combination therewith of a hub member rotatable coaxially of said fan shaft adapted to be continuously driven by said crank shaft, a second hub member rotatable conjointly with said fan shaft, a clutch comprising driving and driven clutch elements one being associated with each of said hub members, one of said hub members being movable relative to the other hub member for clutching or declutching them, selectively, means normally retaining the clutch elements of said hub members engaged, and means for shifting one of said hub members to disengage said clutch elements and substantially simultaneously brake one of said hub members.

GROVER C. PATRICK.
HARRY R. GREENLEE.